United States Patent
Rejkowski et al.

(10) Patent No.: US 9,291,191 B1
(45) Date of Patent: Mar. 22, 2016

(54) AUTOMOTIVE AIR CONDITIONING SYSTEM

(75) Inventors: Michael W. Rejkowski, Irving, TX (US); Dwight A. Dow, Hurst, TX (US)

(73) Assignee: CLASSIC AUTOAIR MANUFACTURING LP, Coppell, TX (US)

( * ) Notice: Subject to any disclaimer, the term of this patent is extended or adjusted under 35 U.S.C. 154(b) by 514 days.

(21) Appl. No.: 13/550,498

(22) Filed: Jul. 16, 2012

Related U.S. Application Data

(60) Provisional application No. 61/508,467, filed on Jul. 15, 2011.

(51) Int. Cl.
| | |
|---|---|
| *F16C 1/10* | (2006.01) |
| *F25B 49/00* | (2006.01) |
| *B60H 1/32* | (2006.01) |
| *F16C 1/12* | (2006.01) |
| *B60H 1/00* | (2006.01) |

(52) U.S. Cl.
CPC .............. *F16C 1/12* (2013.01); *B60H 1/00357* (2013.01)

(58) Field of Classification Search
CPC ............ F16C 1/102; F16C 1/106; F16C 1/12; B60H 1/00357; Y10T 74/20402; Y10T 74/20462
USPC ............... 74/500.5, 501.5 R, 502.6; 236/1 C; 29/402.08; 62/131, 244
See application file for complete search history.

(56) References Cited

U.S. PATENT DOCUMENTS

| | | | |
|---|---|---|---|
| 4,023,435 A * | 5/1977 | LaDue ......................... | 74/502.4 |
| 4,237,967 A | 12/1980 | Harding et al. | |
| 4,611,755 A | 9/1986 | Miyanaga et al. | |
| 5,156,049 A | 10/1992 | Douglas | |
| 5,341,868 A | 8/1994 | Nakata | |
| 5,563,519 A | 10/1996 | Honkanen | |
| 5,791,981 A | 8/1998 | Drobner | |
| 5,893,426 A | 4/1999 | Shimizu et al. | |
| 6,469,527 B1 | 10/2002 | Gardner | |
| 7,971,445 B2 | 7/2011 | Zwicker | |
| 8,641,491 B2 * | 2/2014 | Voigt et al. ..................... | 454/143 |

FOREIGN PATENT DOCUMENTS

EP     1707410 A1     4/2006

OTHER PUBLICATIONS

A.R.A. Manufacturing Company, Installation Instructions, Dodge Ram Model No. 0507831, May 1981.

* cited by examiner

*Primary Examiner* — Adam D Rogers

(57) ABSTRACT

An improved vehicle air conditioning system and a method for its installation, having a control assembly used for temperature and blower adjustments or settings which makes use of existing control panel equipment, as well as new electrical controls, where cables are provided between the original equipment and the new electrical control assembly, and the cables are engaged with a cable integrator including a potentiometer to enable marking of the desired setting adjustments within the vehicle and translation of the settings or adjustments from the manual control panel adjustment to the electrical control assembly which regulates the system output.

7 Claims, 8 Drawing Sheets

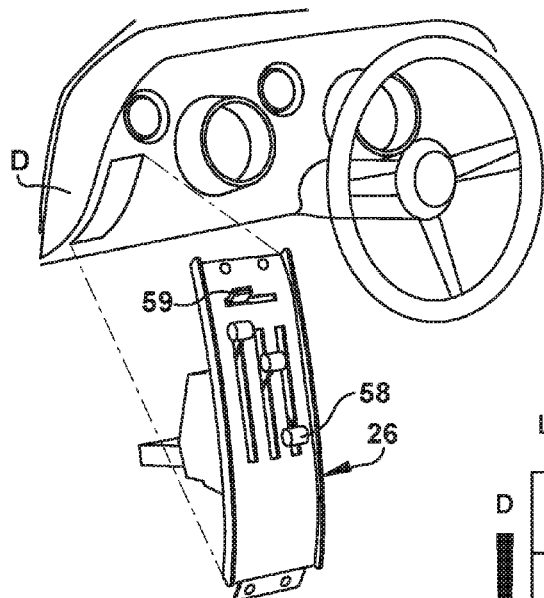
Figure 3
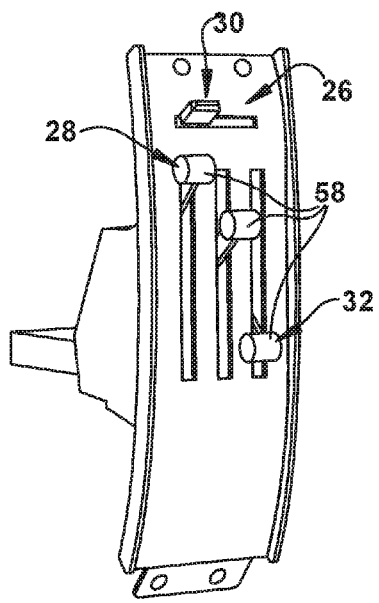
Figure 4
| Left Lever Position | Distribution | | Compressor State |
|---|---|---|---|
| 1 | Face A/C | 100% | ON |
| 2 | Face A/C<br>Defrost | 80%<br>20% | |
| 3 | Face A/C<br>Defrost | 60%<br>40% | |
| 4 | Face A/C<br>Defrost | 40%<br>60% | |
| 5 | Face A/C<br>Defrost | 20%<br>80% | |
| 6 | Defrost | 100% | ON |
| 7 | Face A/C<br>Defrost | 20%<br>80% | |
| 8 | Face A/C<br>Defrost | 40%<br>60% | |
| 9 | Face A/C<br>Defrost | 60%<br>40% | |
| 10 | Face A/C<br>Defrost | 80%<br>20% | |
| 11 | Floor | 100% | |
Figure 5

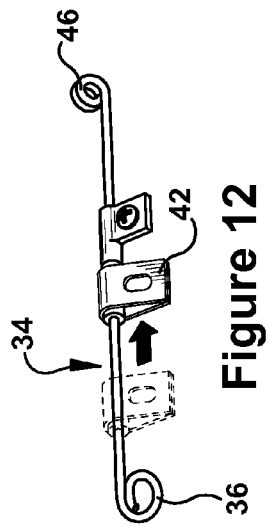
Figure 12
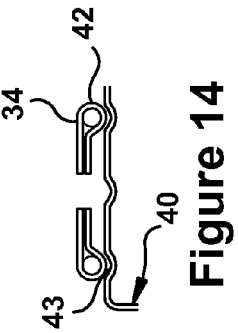
Figure 14
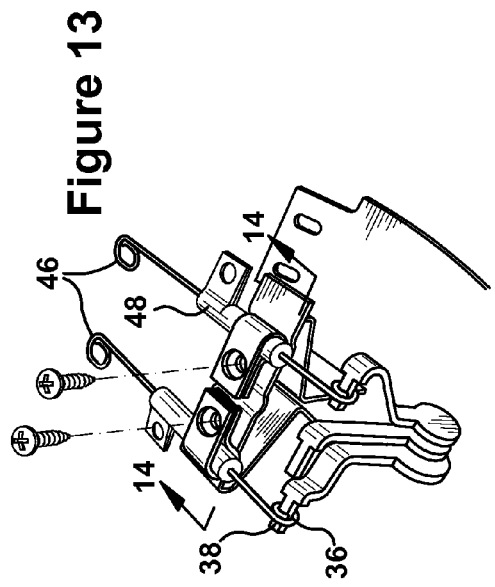
Figure 13
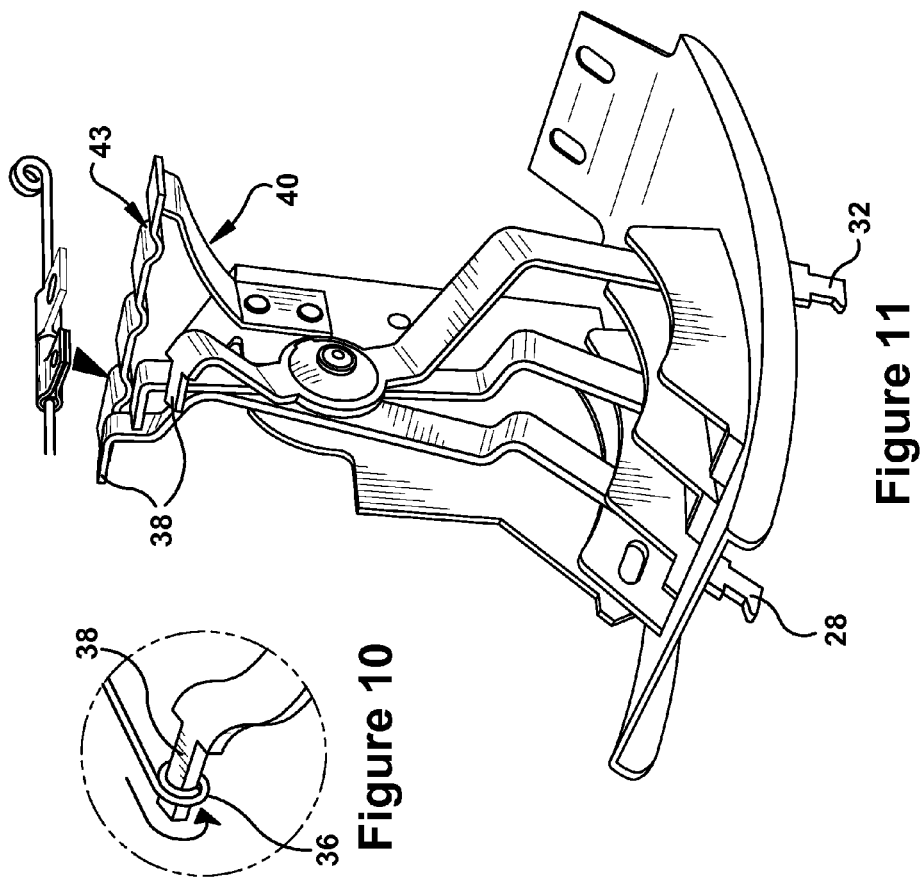
Figure 10
Figure 11

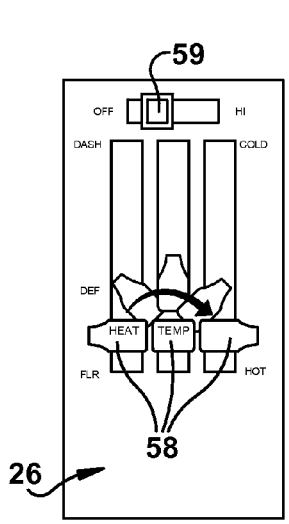 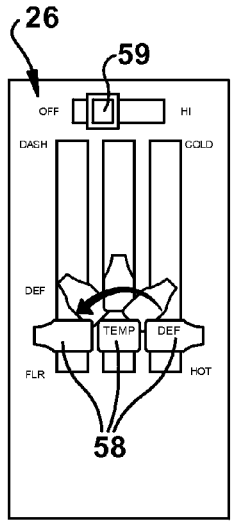 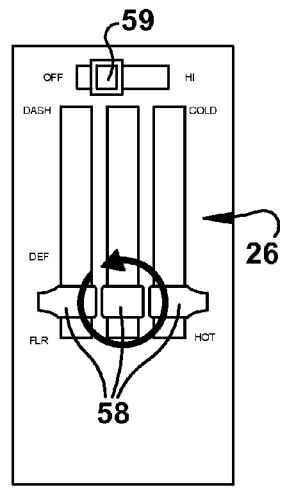
Figure 17A    Figure 17B    Figure 17C
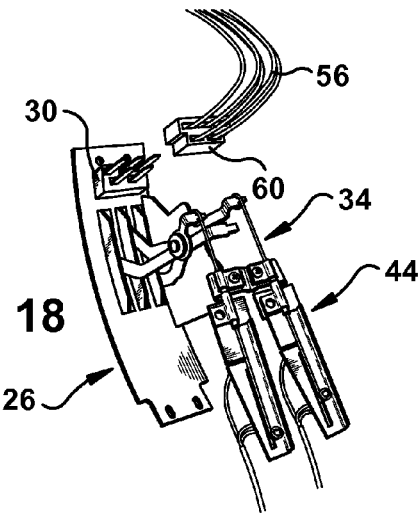
Figure 18
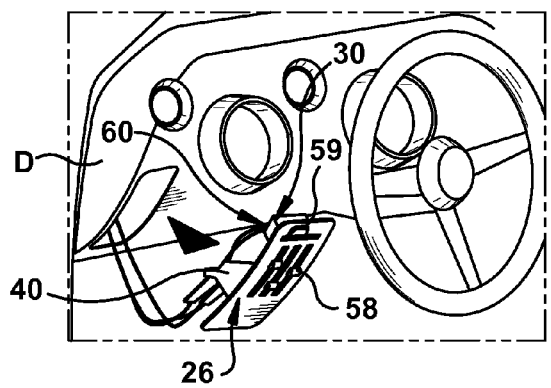
Figure 19

AUTOMOTIVE AIR CONDITIONING SYSTEM

CROSS REFERENCE TO RELATED APPLICATION

This application claims the benefit of Provisional U.S. Patent Application No. 61/508,467, filed Jul. 15, 2011, the subject matter of which is incorporated herein by reference.

FIELD

The present application is directed to an air conditioning system for use in classic vehicles, and more particularly, to a system and method for controlling air conditioning systems in classic vehicles which makes use of cables

BACKGROUND

The use of air conditioning systems within vehicles is a relatively recent addition. It was not until about 1953 when luxury cars began providing an optional air conditioning system as original equipment. In 1954 a more efficient and affordable air conditioning unit was eventually mass produced for the auto industry, with improved performance and fuel economy. However, as comfortable as air conditioning was known to be, it wasn't a frequently ordered accessory until the late 70's, when it became the reliable and efficient system in use today. As a result, many older, restored and rebuilt vehicles do not have air conditioning systems. Moreover, some of the older vehicles which did include early air conditioning systems are in need of repair or replacement.

The use of air conditioning system kits for installation in older vehicles has arisen to provide a solution to the problem of adding or replacing air conditioning systems in these older vehicles. Numerous problems exist with respect to such installation and replacement kits. Original parts are not available or desirable in such systems, since modern electronic components can provide such an improvement in system performance. The appearance and mounting of air conditioning system kits may also be problematic for old car hobbyists, who desire to retain the original appearance and operation of their vehicle. The need for an improved air conditioning system and method for its installation which solves these problems is desired.

SUMMARY

The present application provides an improved vehicle air conditioning system and a method for its installation. The system includes a compressor, condenser, expansion valve, receiver/drier, evaporator and an electrical control assembly. Refrigerant is compressed within the compressor and turns into a gas. The gas is cooled to a liquid state in the condenser and travels to the expansion valve. As the liquid refrigerant goes through the expansion valve it rapidly cools in the evaporator. A fan blows over the evaporator and cools the air that blows out through air vents. The receiver/drier separates gas and liquid. The control assembly is used for temperature and blower adjustments or settings and makes use of existing equipment, as well as new electrical controls. Interconnected with the original equipment are cables provided between the original equipment and the new control assembly, which includes potentiometers, which enable marking of the desired setting adjustments within the vehicle and translation of the settings or adjustments to the control assembly which regulates the system output.

BRIEF DESCRIPTION OF THE DRAWINGS

FIG. 3 is an exploded partial schematic illustration of the control panel for the vehicle temperature and blower system being removed from the interior of a vehicle prior to replacement with the air conditioning system of the present application;

FIG. 4 is an enlarged view of the control panel shown in FIG. 3;

FIG. 5 is a chart illustrating the number of blower switch positions and resulting air flow distribution provided within the vehicle using the air conditioning system of the present application;

FIG. 10 shows an enlarged view of the cable of FIG. 9 secured to the rear of the control panel shown in FIG. 7;

FIG. 11 is a side view of the control panel of FIG. 6, with a portion of the cable illustrated in phantom at the location where the cable will be secured;

FIG. 12 is a schematic illustration of a slidable clamp on the sheathed cable of FIG. 9;

FIG. 13 is a partial exploded schematic rear view of the cables of FIG. 9 engaged with the levers of FIG. 11 and prior to attachment to the base portion of the control panel;

FIG. 14 is a partial end view at the location indicated of the clamps on the sheathed cable engaged with the base portion of the control panel;

FIGS. 17A to 17C are schematic illustrations of the front view of the control panel of FIG. 4, and the proper direction for replacement of the knobs of the control panel;

FIG. 18 is a schematic partial rear view of the control panel, cables, and cable integrators, with the blower switch connector about to be connected with the blower switch; and FIG. 19 is a schematic illustration of the assembled control panel being inserted into the vehicle dash.

DETAILED DESCRIPTION

Figure 1:
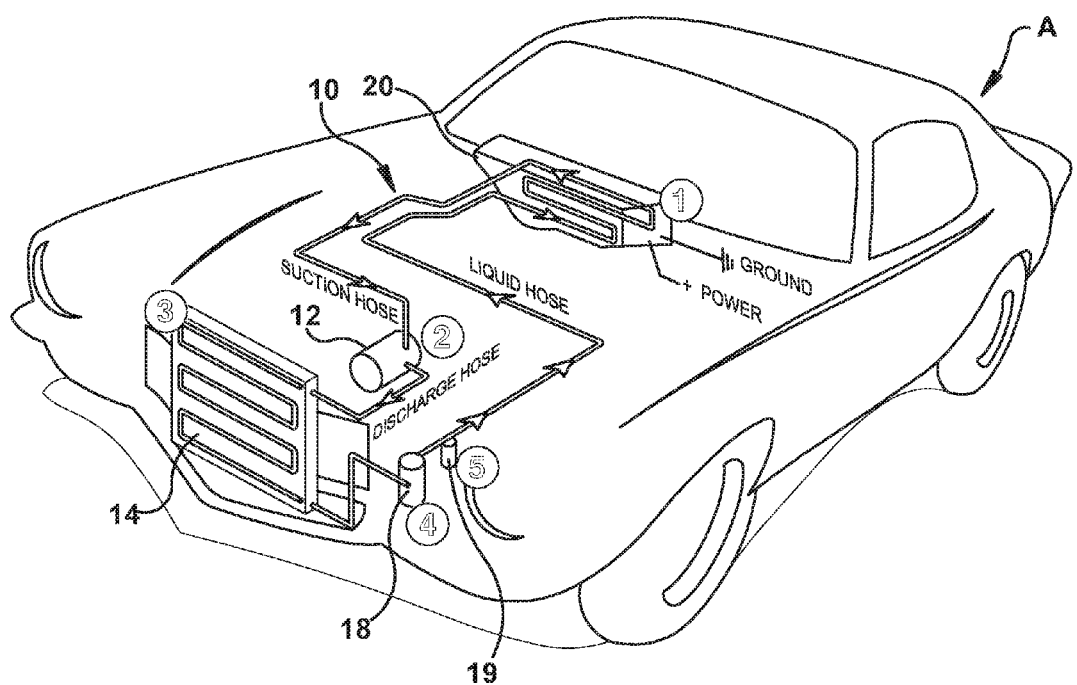
FIG. 1 schematically illustrates the components of a vehicle air conditioning system as used in the present application.
Figure 2:
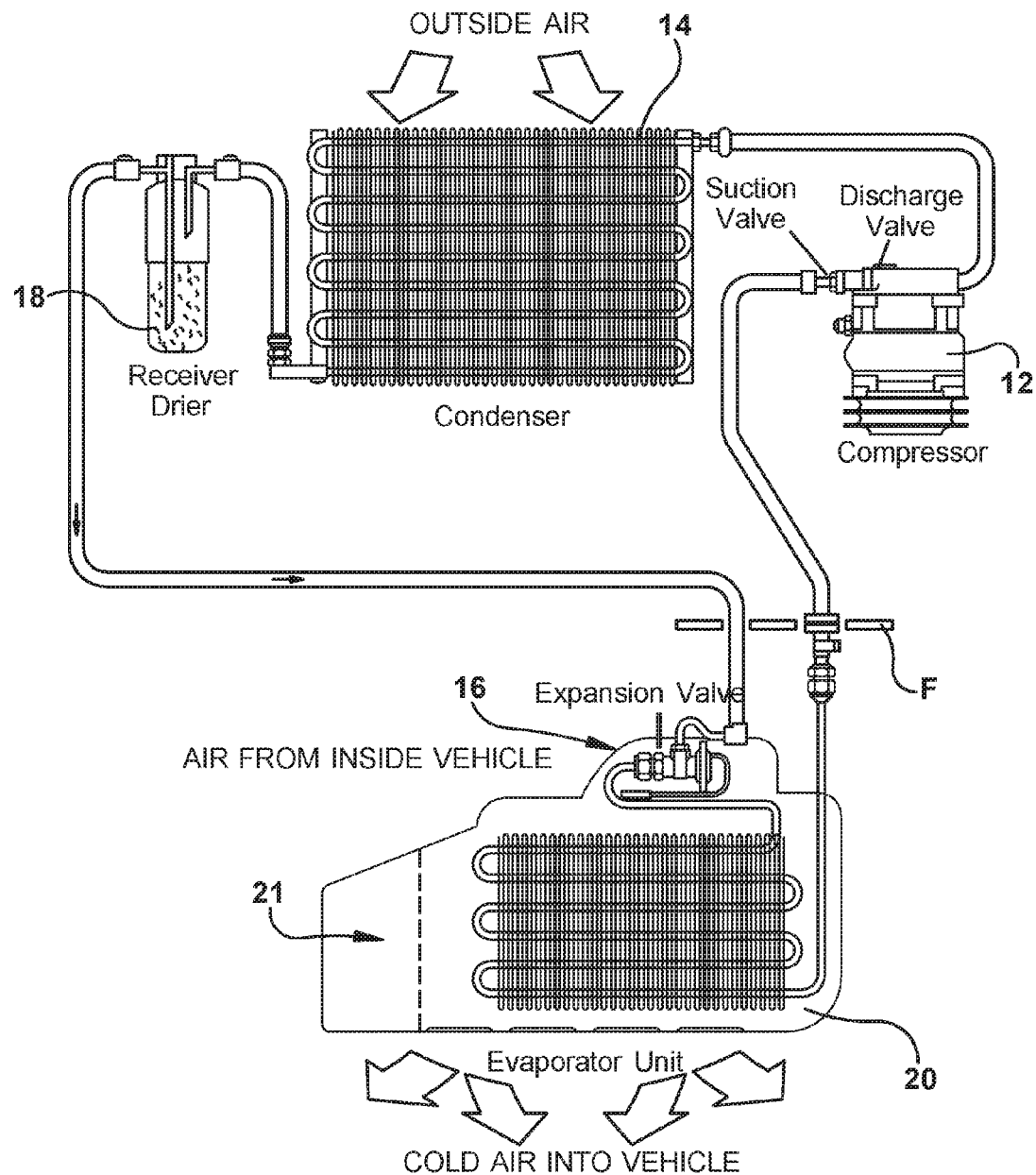
FIG. 2 is a schematic illustration of the more detailed components of the vehicle air conditioning system of FIG. 1, including fluid flow and air flow paths.

As shown in FIG. 1, schematically depicted within an automobile A, the vehicle air conditioning system 10 of the present application includes a compressor 12, a condenser 14, expansion valve 16, a receiver/drier 18, an evaporator 20 with a blower fan 21 and an electrical control assembly 22. A further schematic illustration of these system 10 components is shown in FIG. 2. It should be understood that the present illustrations are provided showing a classic 1967-1968 Ford Mustang, but that numerous other vintage vehicles with similar original equipment heating systems may be replaced with the present environmental system, which provides not only cool air conditioning, but also heating.

In the present system 10, the original equipment control panel 26 of the control assembly 22 is preferably used. FIGS. 3 and 4 illustrate the control panel 26 of the electrical control assembly 22, which is being removed from the dash D of the vehicle in FIG. 3. The control assembly 24 is interconnected with the evaporator 20 and blower fan 21 for controlling the system temperature and fan operating level. FIG. 5 illustrates in chart format the levels of adjustment of the mode lever 28 (there are 11 modes illustrated) which may be moved to direct air flow between the vents V to the vehicle floor F and the vents to the vehicle dash D, and in various combinations of air flow. The present system thus provides the ability to blend the air between the face of anyone in the vehicle, the heat and the defrost mode, simultaneously. The fan switch 30 on the control panel 26 works like the original equipment switch, where the far left position is OFF such that all power to the system is off in this position, and in the far right position, the fan is ON. The temperature lever 32 also works like an original equipment control, with the COLD position at the top and the HOT position at the bottom. When the temperature lever 32 is in the full COLD position at the top, the compressor is ON (as set forth in FIG. 5). This may be thought of as a compressor-override, since the compressor is ON, no matter what position the mode lever is in.

Figure 6:
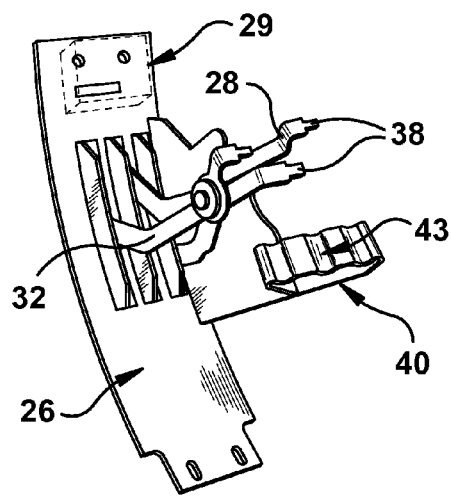
FIG. 6 is a schematic perspective rear view of the control panel shown in FIG. 4.
Figure 7:
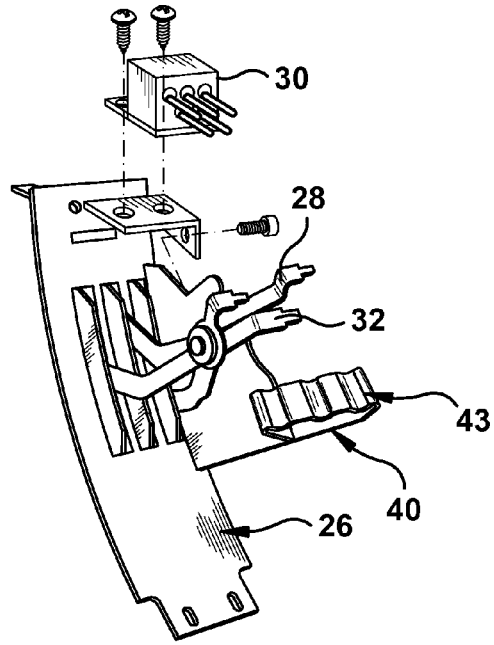
FIG. 7 shows the control panel of FIG. 6, but with an exploded view of the blower bracket and blower switch positioned prior to attachment to the rear of the control panel.

Prior to installation of the present system, the original heater assembly, with its interconnected control cables, blower motor, and electrical harness, is removed for disposal. Coolant should also be drained from the radiator for reuse or recycling. The heater hose is also removed, as well as any fresh air vent assemblies. The original control panel 26 is then removed from the dash as shown in FIG. 3. An original blower switch 29, depicted in phantom in FIG. 6, is removed from the back of the control panel for disposal. A replacement fan or blower switch 30 is then installed, as shown from the back of the control panel in FIG. 7.

Figure 9:
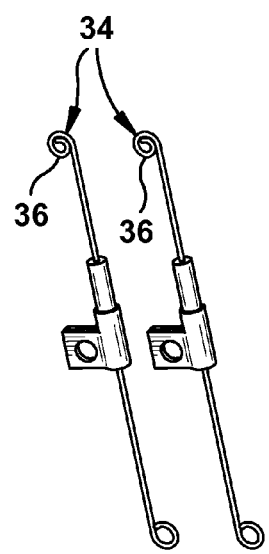
FIG. 9 illustrates the cables interconnecting the cable integrators and the control panel in the air conditioning system of the present application.
Figure 15:
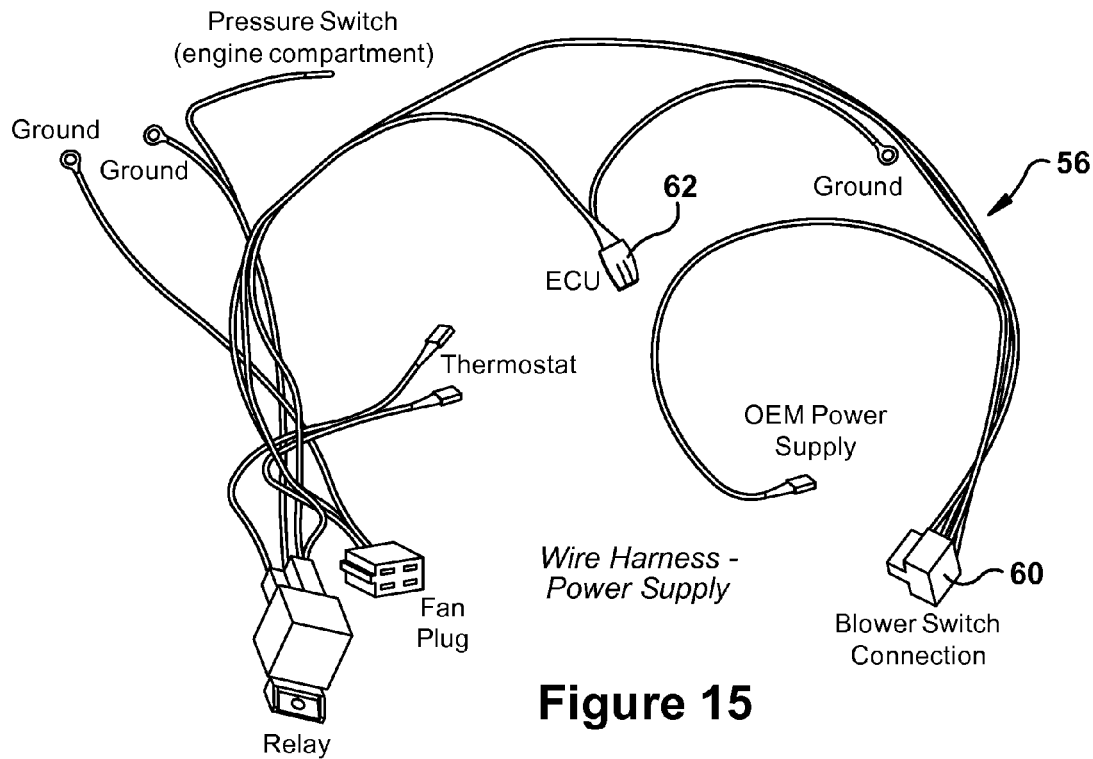
FIG. 15 is a schematic view of the wiring harness of the electrical control assembly of the present application.

Sheathed cables, or Bowden-style conventional control cables 34, are then provided as shown in FIG. 9. The cables 34 are attached to the rear of the control panel 26 to the appropriate mode and temperature levers, 28 or 30, in the manner illustrated in FIG. 10, placing the loop ends 36 around the lever ends 38. To attach the cables 34 to a base portion 40 of the rear of the control panel 26, the slidable cable clamps 42, shown in FIG. 12, are secured via threaded fasteners within the grooves 43 or other locations provided in the base portion 40 of the control panel 26. The attachment of the cable clamps 42 to the base portion 40 is shown in FIG. 13, while an end view of the cable 34 alignment within the grooves 43 is best shown in FIG. 14.

Figure 8:
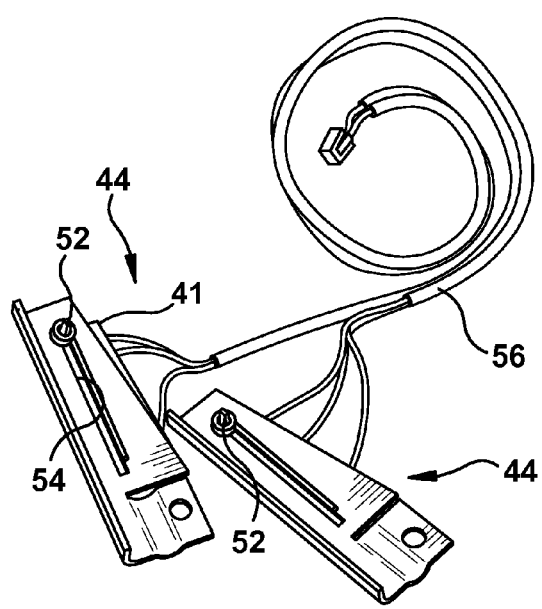
FIG. 8 illustrates the cable integrators of the air conditioning system of the present application.
Figure 16:
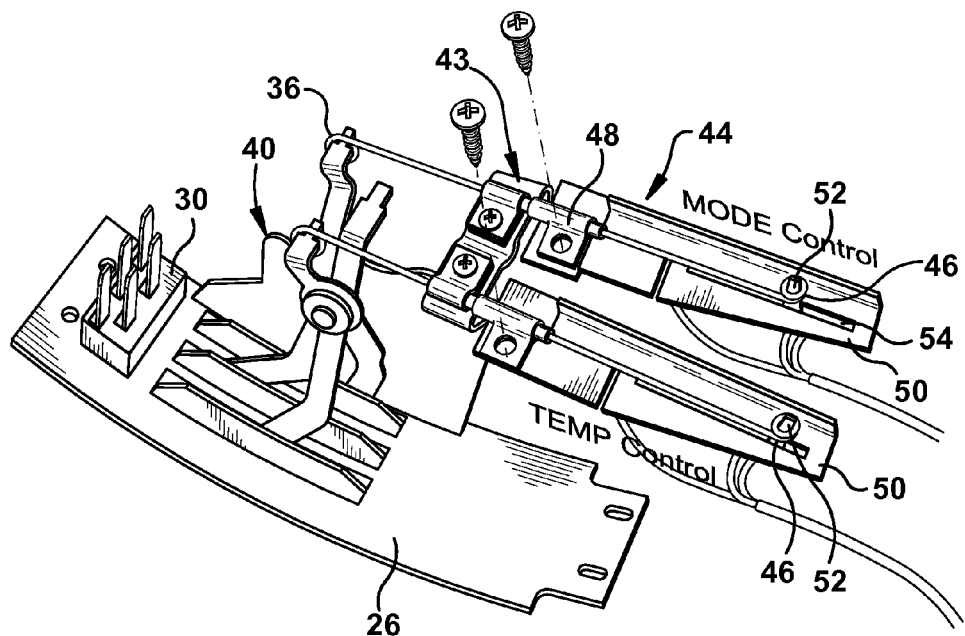
FIG. 16 is a partial schematic exploded rear view of the control panel of FIG. 6, engaged with the cables and cable integrators of the present application.

Improved cable integrators 44, shown in FIG. 8 are next attached to the cables 34. As shown in FIGS. 16 and 18, the control panel 26 is interconnected with the cable integrators 44 at a base plate 43 which is secured to the base portion 40 of the control panel 26. The cable integrators 44 further include a slotted control plate 50 with a post 52 extending through the slot 54, which post 52 is interconnected with a potentiometer 41 on the rear side of the cable integrator which interconnects with the electrical control assembly 22 via a wiring harness 56. The wiring harness 56 is shown in FIG. 8. Using this interconnection between the cable 34 and cable integrator 44 with a potentiometer, the electrical control assembly 22 is used for marking both the location of the desired temperature and mode setting via the control panel 26. The sheathed portion 48 of the cables 34 is attached to the slotted control plate 50. The opposed looped ends 46 of the cables 34 are mechanically secured onto the posts 52 of the cable integrators 44. The cables 34 are attached to the appropriate mode or temperature control posts, consistent with the attachment of the loops 36 to the mode or temperature lever ends 38. In the depicted embodiment, the center lever of the original control panel is unused.

Before installing the control panel 26 back into the dash D, the original equipment knobs 58 are removed from their positions on the levers 28, 32. The knobs 58 are rotated 180 degrees to a position which is upside down from their original mounted position, and then reinstalled on the opposite levers, as shown in FIGS. 17A and 17B. The center, unused, knob 58 should also be removed and rotated 180 degrees and then reinstalled at the same center location, as shown in FIG. 17C. In these new positions, any letters on the knobs will not likely be visible, and the user will quickly adjust to the new positions of the mode and temperature control levers 28, 32. The blower or fan knob 59 should also be reinstalled. The fan or blower switch connection 60 on the wiring harness 56 should also be connected to the fan or blower switch 30 on the back of the control panel 26, as indicated in FIG. 18. Once connected at all the relevant locations, the wiring harness 56 should extend from the dash D, for connection to the control panel 26, which is then re positioned within the dash D and secured with conventional fasteners in its original location, as shown in FIG. 19.

Figure 20:
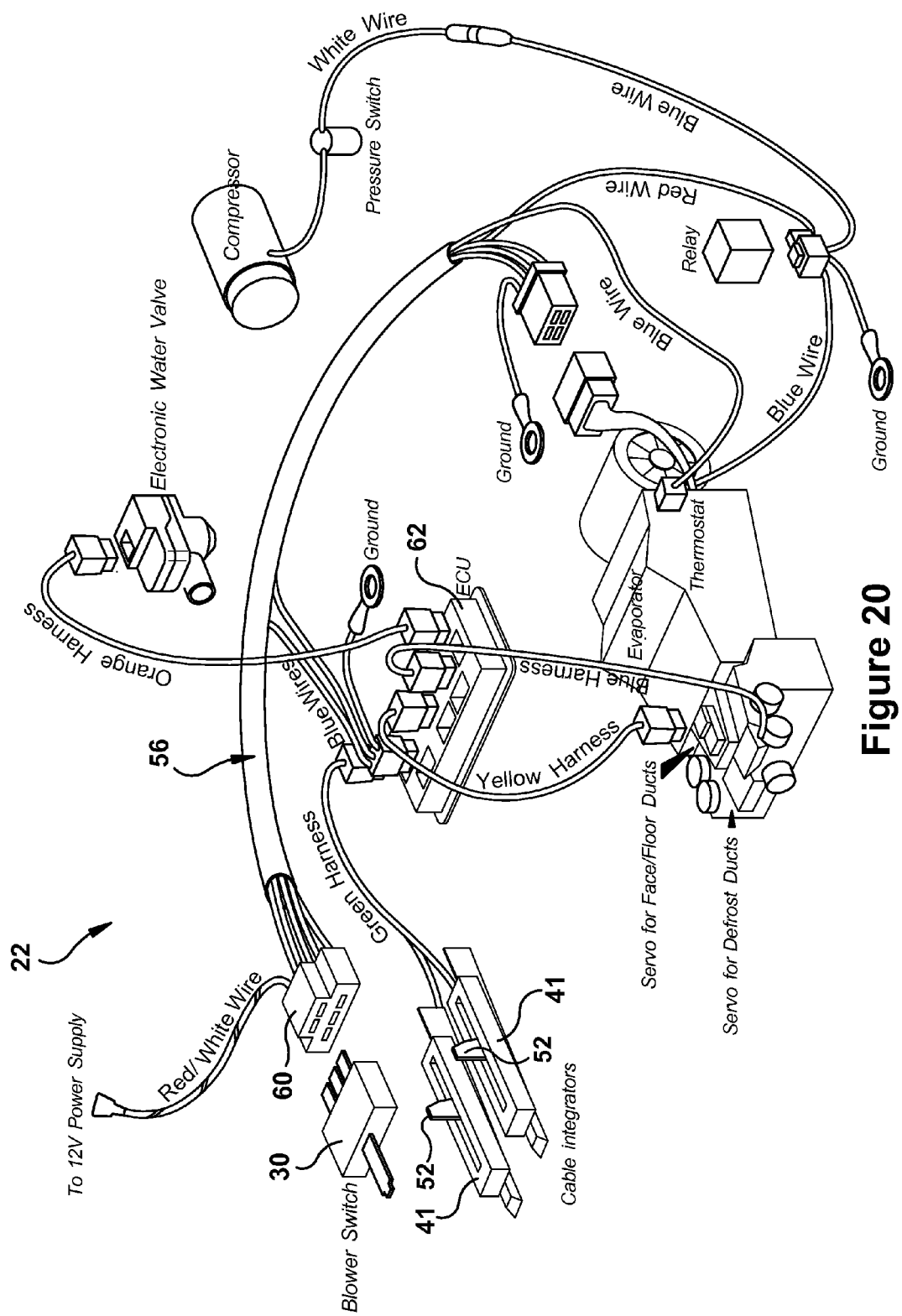
FIG. 20 is a schematic illustration of the unconnected components and the associated electrical wiring system elements for the vehicle air conditioning system of the present application.

Following completion of the control panel installation, additional components are also installed to obtain a functional system. For example, the original fuses are upgraded, air inlet and heater motor opening block offs may be installed, new water drainage and heater hoses are connected, and a firewall block off may be installed. The new evaporator and blower fan are installed and interconnected with the electrical control assembly 22, having an ECU or electrical control unit 62, via the wiring harness 56. An electrical diagram for the electrical control assembly 22 is depicted in FIG. 20. Once the electrical control assembly 22 is installed, the electrical control unit 62 should be calibrated by conventional methods to ensure operation at the desired maximum efficiency. Additional duct work and hoses should likewise be installed to connect the defrost and heat duct assembly to the appropriate vents and outlets.

Within the engine compartment, spaced apart by the firewall F, additional installation of the condenser 14 and drier 18 and the high and low pressure lines, liquid lines and pressure switch 19 are also required. Once the pressure switch 19 is installed, the wiring harness 56 may be interconnected. Finally, the compressor 12 is installed and the necessary hoses and lines are interconnected, as well as the pressure switch 19. Prior to operation, all hoses and clamps should be tightened, the compressor 12 must be appropriately charged with refrigerant, the radiator should be refilled with coolant and the battery reconnected.

Although the system, devices and method of the present application have been described in detail sufficient for one of ordinary skill in the art to practice the invention, it should be understood that various changes, substitutions and alterations may be made without departing from the spirit or scope of the system as defined in the attached claims. Moreover, the scope of the present system, devices and method is not intended to be limited to the specific embodiments described here, which are provided by way of example. As one of ordinary skill in the art will readily appreciate from the disclosure of the present system, devices, methods and embodiments, other systems, components or methods, presently existing or later to be developed that perform substantially the same function to achieve substantially the same result as those of the corresponding embodiments described here, may be utilized according to the present application. Accordingly, the appended claims are intended to include within their scope such other systems, devices, components or methods.

We claim:

1. A vehicle air conditioning system having a vehicle air conditioning system control panel interconnected with a Bowden-style cable and cable integrator, where the Bowden-style cable is engaged on one end with the vehicle air conditioning system control panel for manual adjustment by a vehicle passenger, and is supported along its length on the cable integrator, and the Bowden-style cable is engaged on a second end with the cable integrator on a post interconnected with a potentiometer which controls marking of settings of the vehicle air conditioning system control panel.

2. The vehicle air conditioning system of claim 1, wherein the cable integrator has a base portion for attachment to the vehicle air conditioning system control panel, an opening within the base portion, the post interconnected with the potentiometer housed within the base portion, and wherein the post extends through the opening.

3. The vehicle air conditioning system of claim 2, wherein the opening in the base portion of the cable integrator is an elongated slot.

4. The vehicle air conditioning system of claim 1, wherein the vehicle air conditioning system control panel includes two or more desired settings.

5. The vehicle air conditioning system of claim 4, wherein the adjustable vehicle air conditioning system control panel includes a temperature setting.

6. The vehicle air conditioning system of claim 4, wherein the adjustable vehicle air conditioning system control panel includes a system mode setting.

7. The vehicle air conditioning system of claim 4, wherein the adjustable vehicle air conditioning system control panel includes a fan or blower setting.

* * * * *